(12) United States Patent
Takaishi

(10) Patent No.: US 6,421,200 B2
(45) Date of Patent: Jul. 16, 2002

(54) CONTROL METHOD AND CONTROL DEVICE FOR A DISK STORAGE DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/748,973

(22) Filed: Dec. 27, 2000

Related U.S. Application Data

(63) Continuation of application No. PCT/JP99/00164, filed on Jan. 19, 1999.

(30) Foreign Application Priority Data

Jun. 30, 1998 (JP) .......................................... 10-185046

(51) Int. Cl.⁷ ............................................. G11B 5/596
(52) U.S. Cl. ................................. 360/78.09; 360/77.04
(58) Field of Search ...................... 360/77.04, 78.09; 369/44.14, 44.32

(56) References Cited

U.S. PATENT DOCUMENTS

| 5,065,263 A | 11/1991 | Yoshida et al. ........... 360/77.03 |
| 5,404,253 A | 4/1995 | Painter .................... 360/77.04 |
| 5,550,685 A | * 8/1996 | Drouin ................ 360/77.04 X |
| 5,585,976 A | * 12/1996 | Pham .................. 360/78.09 X |
| 5,608,586 A | * 3/1997 | Sri-Jayantha et al. .... 360/77.04 |
| 5,886,846 A | * 3/1999 | Pham et al. ......... 360/77.04 X |

FOREIGN PATENT DOCUMENTS

| JP | 2-108288 A | 4/1990 | .............. 360/77.03 |
| JP | 07050075 A | 2/1995 | .............. 360/77.04 |

* cited by examiner

Primary Examiner—David Hudspeth
Assistant Examiner—K. Wong
(74) Attorney, Agent, or Firm—Greer, Burns & Crain, Ltd

(57) ABSTRACT

This invention comprises a head 3 for reading information from a disk storage medium 2, an actuator 5 for moving the head 3, and a control circuit 8 for calculating a control signal from the position signal, that was read by the head, using an eccentricity observer 21. The control circuit 8 selects a first eccentricity estimation gain during seek control and selects a second eccentricity estimation gain during following control. This makes it possible to perform seek control that is not affected by the eccentricity error.

24 Claims, 13 Drawing Sheets

FIG. 10

| ADDRESS | DATA |
|---|---|
| 0H | Head 0, X4 |
| 2H | Head 0, X5 |
| 4H | Head 1, X4 |
| 6H | Head 1, X5 |
| 8H | Head 2, X4 |
| AH | Head 3, X5 |
| ... | ... |

CONTROL METHOD AND CONTROL DEVICE FOR A DISK STORAGE DEVICE

This is a continuation of International Application No. PCT/JP99/00164, having an international filing date of Jan. 19, 1999, and not published in English.

FIELD OF THE INVENTION

This invention relates to a control method and control device for controlling an actuator to move a head to a target position in a disk storage device, that reads or reads/writes information from a disk storage medium by the head.

BACKGROUND OF THE INVENTION

Disk storage devices such as magnetic disk drives or optical disk drives are widely used as storage devices for computers and the like. In these kinds of disk storage devices, eccentricity of the disk medium occurs. This eccentricity occurs when the center of rotation of the disk medium that was recorded the position information shifts when that of writing the position information.

In the sector servo method, the position information (servo information) for detecting the actuator position is recorded on each disk surface. This position information is formed on concentric circles. When the center of rotation of the disk matches with the center of rotation of the disk when the position information was written, then ideally no eccentricity will occur.

However, in actuality, the centers of rotation do not match and eccentricity occurs. The reason for this is probably due to thermal deformation of the disk medium and a spindle shaft, or shifting of the disk due to external impact. When there is eccentricity, it can be seen from the actuator's point of view that sinusoidal disturbance on the order of integral multiples of the rotation frequency is applied. Therefore, a technique for correcting this eccentricity is necessary.

Control using an eccentricity estimation observer (estimator) has been known as a technique for correcting this eccentricity. In the control by this eccentricity estimation observer, steady position control by the estimated values is required.

FIG. 12 is a configuration drawing of this prior art, and FIG. 13 is a drawing for explaining this prior art.

Position control of a magnetic head by the use of an eccentricity estimation observer is described in detail in Japanese Unexamined Published patent No. 7-50075 (U.S. Pat. No. 5,404,235). Therefore, the eccentricity estimation observer will only be simply explained here.

First, an ideal actuator model that does not include resonance will be considered. Here, when 'x1' is taken to be the position, 'x2' the velocity, 'y' the observed position (detected position), 'u' the control current and 's' the Laplace operator, then the state equations are given by equations (1) and (2) below.

$$S\begin{pmatrix} X_1 \\ X_2 \end{pmatrix} = \begin{pmatrix} 0 & 1 \\ 0 & 0 \end{pmatrix}\begin{pmatrix} X_1 \\ X_2 \end{pmatrix} + Kp\begin{pmatrix} 0 \\ 1 \end{pmatrix}u \quad (1)$$

$$y = (1\ 0)\begin{pmatrix} X_1 \\ X_2 \end{pmatrix} \quad (2)$$

Here, 'Kp' is the acceleration constant when rotating type actuator of the model is considered to be an equivalent linear type actuator.

When considering the current feedback, the steady-state current (bias current) state 'x3' is added to the state equations, and thus the state equations are given by equations (3) and (4) below.

$$S\begin{pmatrix} X_1 \\ X_2 \\ X_3 \end{pmatrix} = \begin{pmatrix} 0 & 1 & 0 \\ 0 & 0 & K_p \\ 0 & 0 & 0 \end{pmatrix}\begin{pmatrix} X_1 \\ X_2 \\ X_3 \end{pmatrix} + Kp\begin{pmatrix} 0 \\ 1 \\ 0 \end{pmatrix}u \quad (3)$$

$$y = (1\ 0\ 0)\begin{pmatrix} X_1 \\ X_2 \\ X_3 \end{pmatrix} \quad (4)$$

Furthermore, the eccentricity disturbance state is added to these state equations. When 'x4' and 'x5' are taken to be the state variable of the eccentricity, and 'ω0' is taken to be the eccentric angular velocity, then the state equations are given by equations (5) and (6) below.

$$S\begin{pmatrix} X_1 \\ X_2 \\ X_3 \\ X_4 \\ X_5 \end{pmatrix} = \begin{pmatrix} 0 & 1 & 0 & 0 & 0 \\ 0 & 0 & Kp & Kp & 0 \\ 0 & 0 & 0 & 0 & 0 \\ 0 & 0 & 0 & 0 & 1 \\ 0 & 0 & 0 & -\omega_0^2 & 0 \end{pmatrix}\begin{pmatrix} X_1 \\ X_2 \\ X_3 \\ X_4 \\ X_5 \end{pmatrix} + Kp\begin{pmatrix} 0 \\ 1 \\ 0 \\ 0 \\ 0 \end{pmatrix}u \quad (5)$$

$$y = (1\ 0\ 0\ 0\ 0)\begin{pmatrix} X_1 \\ X_2 \\ X_3 \\ X_4 \\ X_5 \end{pmatrix} \quad (6)$$

Here, when x4=cos(ω0·t) and x5=sin(ω0·t), then sx4=−ω0·sin(w0·t) and sx5=ω0·cos(ω0·t), so sx4=−ω0·x5 and sx5=ω0·x4. Therefore, the state equations (5) and (6) are given by equations (7) and (8) below.

$$S\begin{pmatrix} X_1 \\ X_2 \\ X_3 \\ X_4 \\ X_5 \end{pmatrix} = \begin{pmatrix} 0 & 1 & 0 & 0 & 0 \\ 0 & 0 & Kp & Kp & 0 \\ 0 & 0 & 0 & 0 & 0 \\ 0 & 0 & 0 & 0 & -\omega_0 \\ 0 & 0 & 0 & \omega_0 & 0 \end{pmatrix}\begin{pmatrix} X_1 \\ X_2 \\ X_3 \\ X_4 \\ X_5 \end{pmatrix} + Kp\begin{pmatrix} 0 \\ 1 \\ 0 \\ 0 \\ 0 \end{pmatrix}u \quad (7)$$

$$y = (1\ 0\ 0\ 0\ 0)\begin{pmatrix} X_1 \\ X_2 \\ X_3 \\ X_4 \\ X_5 \end{pmatrix} \quad (8)$$

In equation (5) the eccentricity is estimated by the sinusoidal transfer function $(1/(S^2+\omega 0^2))$. As shown in FIG. 13, equation (7) shows the movement in rectangular coordinates (x4,x5) of a point on the circle with radius (x4^2+x5^2) that is rotating at constant velocity.

The observer is designed to transfer the state equations (7) and (8) to a discrete form. The equations are transferred into a discrete form by estimating the zero-dimension hold. In other words, it performs Z conversion. By considering the time lag from when the position is detected until current is output to the actuator, state equations become 6 dimensional. Even when not considered, the state equations are given by equations (9) and (10) below.

$$\begin{pmatrix} X_1[K+1] \\ X_2[K+1] \\ X_3[K+1] \\ X_4[K+1] \\ X_5[K+1] \end{pmatrix} = \quad (9)$$

$$\begin{pmatrix} 1 & T & \frac{KpT^2}{2} & \frac{Kp}{\omega_0^2}(1-\cos(\omega_0 T)) & \frac{Kp}{\omega_0^2}(\omega_0 T - \sin(\omega_0 T)) \\ 0 & 1 & KpT & \frac{Kp - \sin(\omega_0 T))}{\omega_0} & \frac{Kp}{\omega_0}(1 - \cos(\omega_0 T)) \\ 0 & 0 & 1 & 0 & 0 \\ 0 & 0 & 0 & \cos(\omega_0 T) & -\sin(\omega_0 T) \\ 0 & 0 & 0 & \sin(\omega_0 T) & \cos(\omega_0 T) \end{pmatrix}$$

$$\begin{pmatrix} X_1[K] \\ X_2[K] \\ X_3[K] \\ X_4[K] \\ X_5[K] \end{pmatrix} + Kp \begin{pmatrix} T^2/2 \\ T \\ 0 \\ 0 \\ 0 \end{pmatrix} u[k]$$

$$y[k] = (1\ 0\ 0\ 0\ 0) \begin{pmatrix} X_1[K] \\ X_2[K] \\ X_3[K] \\ X_4[K] \\ X_5[K] \end{pmatrix} \quad (10)$$

Here, T is the sample period. As shown in equation (11), the coefficients in equations (9) and (10) are A, B and C.

$$A = \begin{pmatrix} 1 & T & \frac{KpT^2}{2} & \frac{Kp}{\omega_0^2}(1-\cos(\omega_0 T)) & \frac{Kp}{\omega_0^2}(\omega_0 T - \sin(\omega_0 T)) \\ 0 & 1 & KpT & \frac{Kp - \sin(\omega_0 T))}{\omega_0} & \frac{Kp}{\omega_0}(1 - \cos(\omega_0 T)) \\ 0 & 0 & 1 & 0 & 0 \\ 0 & 0 & 0 & \cos(\omega_0 T) & -\sin(\omega_0 T) \\ 0 & 0 & 0 & \sin(\omega_0 T) & \cos(\omega_0 T) \end{pmatrix}, \quad (11)$$

$$B = Kp \begin{pmatrix} T^2/2 \\ T \\ 0 \\ 0 \\ 0 \end{pmatrix}$$

$$C = (1\ 0\ 0\ 0\ 0)$$

Here, the observer is expressed by the equations (12), (13) and (14) below.

$$\begin{pmatrix} PX_1[K+1] \\ PX_2[K+1] \\ PX_3[K+1] \\ PX_4[K+1] \\ PX_5[K+1] \end{pmatrix} = A \begin{pmatrix} PX_1[K] \\ PX_2[K] \\ PX_3[K] \\ PX_4[K] \\ PX_5[K] \end{pmatrix} + B \cdot u[k] + \begin{pmatrix} L_1 \\ L_2 \\ L_3 \\ L_4 \\ L_5 \end{pmatrix} (y[k] - PX_1[k]) \quad (12)$$

$$py[k] = C \begin{pmatrix} PX_1[K] \\ PX_2[K] \\ PX_3[K] \\ PX_4[K] \\ PX_5[K] \end{pmatrix} \quad (13)$$

$$u[k] = -(F_1\ F_2\ 1\ 1\ 0) \begin{pmatrix} PX_1[K] \\ PX_2[K] \\ PX_3[K] \\ PX_4[K] \\ PX_5[K] \end{pmatrix} \quad (14)$$

Here, px1 is the state variable for position (estimated position), px2 is the state variable for velocity (estimated velocity), px3 is the state variable for the bias current (estimated bias current), px4 and px5 are state variable for the eccentricity (estimated eccentricity), 'u' is the control current, 'y' is the observed position (detected position) and 'py' is the estimated position.

Moreover, L1 to L5 are the estimation gains of the observer, where L1 is the position estimation gain, L2 is the velocity estimation gain, L3 is the bias estimation gain, and L4 and L5 are the eccentricity estimation gains. Furthermore, F1 to F5 are the state feedback matrix.

When this is shown in a block diagram, a diagram as shown in FIG. 12 is obtained. In other words, a plant 90 shows the portion that performs real positioning of the head of a magnetic disk drive, and includes an actuator, AMP and magnetic heads. The observer (estimator) 91 estimates the position, velocity, bias and eccentricity from the current state, and outputs control current.

The position signal (servo signal) y[k] that is read by the magnetic head is output from the plant 90. The observer 91 calculates the error (y[k]−px1[k]) between the position signal y[k] and the estimated position py[k] (=px1[k]). The error is input to the fourth gain multiplier 96. The gain multiplier 96 multiplies the error by the estimation gain L (L2 to L5) (see equation (12)). L1 to L3 is the estimated operating gain of the actuator, and L4 and L5 are the eccentricity estimation gain.

The second gain multiplier 94 multiplies the control current u[k] by the coefficient B (see equation (12)). The third gain multiplier 95 multiplies the state signal px[k] at the time of this sample by coefficient A (see equation (12)). An adder 98 adds the outputs from the three adders 94 to 96. From this the state signal px[k+1] for the next sample of equation (12) is output.

This state signal px[k+1] for the next sample is delayed one sample by an delay circuit 99 to obtain the state signal px[k] for this sample. This state signal px[k] is then multiplied by a feedback coefficient 'C' by a fifth multiplier 97. From this, the estimated position py[k] for this sample, as given by Equation (13), is obtained.

Furthermore, the state signal px[k] is multiplied by the feedback coefficient 'F' by a first multiplier 93. From this, the control current u[k] for this time, as given by Equation (14), is obtained. This control current u[k] is supplied to the plant 90.

In this way, the observer 91 is comprised by an eccentricity estimation observer including the actuator model and eccentric model, and it predicts the next state from the error between the detected position and estimated position, the control current and the state variables, and creates a control current from the state. In this way, the eccentricity is corrected in real time making it possible to quickly correct. In this prior art, a control signal was created by a similar configuration during seek control time as well.

However, this prior art had the following problems.

First, during seeking, the actuator moves at high speed so it may move more than 50 tracks per sample. When it moves at high speed like this, it is not possible to accurately detect the position for each sample. Therefore, the eccentricity estimation observer estimates the amount of eccentricity from the position error and thus error occurs in the estimated amount of eccentricity. It is a long time that the eccentricity state converges if there is the error, because convergence is slow at about 90 Hertz. This becomes a problem in that convergence at the end of seeking becomes slow.

Second, when seeking over a long distance, the output current of the current amp becomes saturated. The maximum current during saturation differs depending on the power-supply voltage or the actuator resistance, and it is greatly affected by variations in differences in the environment and equipment. Therefore, since the eccentricity estimation observer does not predict the saturation of the output current of the current amp, errors occur in the amount of eccentricity that is estimated from the position error. Therefore, there was the problem the convergence becomes slow after seeking.

DISCLOSURE OF THE INVENTION

The objective of this invention is to provide a control method and control device for a disk storage device that prevent a slow convergence when seek end.

Another objective of this invention is to provide a control method and control device for a disk storage device that prevent a slow convergence when seek end even when eccentricity correction is performed.

A further objective of this invention is to provide a control method and control device for a disk storage device that prevent a position error from affecting the estimated value for the eccentricity.

The disk storage device of this invention comprises: a disk storage medium, a head for reading information on the disk storage medium, an actuator for moving the head, and a control circuit, that uses eccentricity estimation observer control that includes an actuator model and eccentric model, for calculating a control signal for driving the actuator based on a position signal that is read from the disk storage medium by the head.

In addition, the control method and device of this invention comprises: a step of selecting a first eccentricity estimation gain during seek control, and for selecting a second eccentricity estimation gain during following control; and a step of calculating a state signal, which includes the estimated position, estimated velocity, estimated bias signal and estimated eccentricity signal, and which is based on the estimated actuator gain, that estimates the actuator operation, and the selected eccentricity estimation gain, and of calculating the control signal from the state signal.

In this invention, the amount of eccentricity is not estimated from the position error during seeking since large errors occur on the amount of eccentricity when estimating it from the position error during seeking. However, in order for a steady seek operation, it is necessary to correct the eccentricity. Therefore, this invention minimizes the eccentricity estimation gains L4, L5 of the eccentricity estimation observer during seek more than during following, to prevent the position error from affecting the estimated amount of eccentricity.

For example, during seeking, the eccentricity estimation gains L4, L5 are taken to be '0'. By doing this, the state equation (12) becomes equation (15) below.

$$\begin{pmatrix} PX_1[K+1] \\ PX_2[K+1] \\ PX_3[K+1] \\ PX_4[K+1] \\ PX_5[K+1] \end{pmatrix} = A \begin{pmatrix} PX_1[K] \\ PX_2[K] \\ PX_3[K] \\ PX_4[K] \\ PX_5[K] \end{pmatrix} + B \cdot u[k] + \begin{pmatrix} L_1 \\ L_2 \\ L_3 \\ 0 \\ 0 \end{pmatrix} (y[k] - PX_1[k]) \qquad (15)$$

In this equation (15), by calculating the state variables X4 and X5 for eccentricity, the equation (16) below is obtained.

$$\begin{pmatrix} PX_4[K+1] \\ PX_5[K+1] \end{pmatrix} = \begin{pmatrix} \cos(\omega_0 T) & -\sin(\omega_0 T) \\ \sin(\omega_0 T) & \cos(\omega_0 T) \end{pmatrix} \begin{pmatrix} PX_4[K] \\ PX_5[K] \end{pmatrix} \qquad (16)$$

In equation (16), the state variable X4 and X5 for eccentricity become unrelated to the observed position y and estimated position x1. In other words, state variables X4 and X5 that are not affected by the position error (y[k] - x1[k]) are obtained. In equation (16), $\omega_0 T$ is the phase for one sample. In addition, equation (16) shows that the current state variables have a phase shift of only one sample. In other words, equation (16) is a sinusoidal recursive equation.

Therefore, it is possible to prevent the position error from affecting the estimated eccentricity value when seeking. Moreover, it is possible to quicken the convergence operation after seeking. Also, as shown in equation (16), since the eccentricity is corrected during seeking, there is no loss of stability during seeking. The eccentricity estimation gain during seek, does not need to be '0', but can be a value near '0'.

Moreover, another form of the invention further comprises a step of detecting the position error between the target position and the current position, and a step of determining that control is the aforementioned following control when the position error is within a specified range, and of determining that control is the aforementioned seek control when the position error exceeds the specified value by comparing the position error and the specified values.

Furthermore, in another form of the invention, the calculation step comprises: a first calculation step of calculating the estimated position signal, estimated velocity signal and estimated eccentricity signal for the next sample from the estimated position signal, estimated velocity signal, estimated eccentricity signal, estimated actuator gain and eccentricity estimation gain of the current sample; and a second calculation step of calculating the control current from estimated position signal, estimated velocity signal and estimated eccentricity signal of the current sample. In other words, the eccentricity estimation observer is a prediction observer.

In yet another form of the invention, the aforementioned first calculation step comprises: a third calculation step of calculating the estimated position signal and estimated velocity signal for the next sample from the estimated position signal, estimated velocity signal and estimated actuator gain of the current sample; and a fourth calculation step of calculating the estimated eccentricity signal for the next sample from the estimated eccentricity signal and from the eccentricity estimation gain of the current sample.

In this form of the invention, the calculation of estimating the actuator operation is separate from the calculation of estimating the amount of eccentricity, so the amount of calculation is reduced. Therefore it is possible to quickly calculate the estimated amount.

In even yet another form of the invention, the calculation step comprises: a fifth calculation step of calculating the corrected state signal based on the error, the previously calculated state signal, estimated actuator gain and eccentricity estimation gain; a sixth calculation step of calculating the control signal from the corrected state signal; and a seventh calculation step of calculating the next state signal from the control signal and corrected state signal.

In this form of the invention, the eccentricity estimation observer is a current observer. Therefore it is suitable for processor processes.

Furthermore, in yet another form of the invention, the aforementioned fifth calculation step comprises: an eighth calculation step of calculating the corrected estimated position signal and estimated velocity schedule from the error, and estimated position signal and estimated velocity signal from the previous sample, and the estimated actuator gain; and a ninth calculation step of calculating the estimated eccentricity signal for the next sample from the aforementioned error, and the estimated eccentricity signal from the previous sample and the estimated eccentricity gain.

In the current observer of this form of the invention, the calculation for estimating the actuator operation and the calculation for estimating the amount of eccentricity are separate, so the amount of calculations is reduced. Therefore, it is possible to calculate the estimations quickly.

In another form of the invention, the calculation step comprises: a tenth calculation step of calculating the corrected estimated position signal and estimated velocity signal from the error, the previous estimated position signal and estimated velocity signal and the estimated actuator gain; an eleventh calculation step of calculating the control signal based on the corrected estimated position signal and previous estimated eccentricity signal; and a twelfth calculation step of calculating the estimated position signal, estimated velocity signal and estimated eccentricity signal for the next time, based on the corrected estimated position signal, corrected estimated velocity signal and previous estimated eccentricity signal.

In this form of the invention, since the calculation of the estimated eccentricity signal for the next time is performed after the calculation of the control signal, the time from when the position signal is sample until the control signal is output is shortened. Therefore, it is possible to quickly output the control signal.

Furthermore, another form of the invention comprises: a saving step of saving the estimated eccentricity signal for the head before changing when there is an instruction to change the head; and a step of reading the estimated eccentricity signal for the changed head and executing the aforementioned calculation steps with the read estimated eccentricity signal as the initial value.

In this form of the invention, since the amount of eccentricity varies for each head, or in other words for each surface of the disk medium, it is necessary to change the state variable for the eccentricity for each head. When doing this, the state variable for eccentricity is saved for each head, and by changing the state variable when changing heads, it is possible to initialize the eccentricity estimation observer with a state variable that matches that head.

In another form of the invention, the saving step comprises a saving step of saving the conversion value after the estimated eccentricity signal has been converted to an estimated eccentricity signal for the reference sector, and the execution step comprises a step of correcting the saved estimated eccentricity signal to an estimated eccentricity signal of the current sector.

In this form of the invention, when saving the initial value of the eccentricity estimation observer for each head, only two state variables need to be saved. Therefore, it is possible to reduce the amount of memory required for saving the state variable for eccentricity.

BRIEF DESCRIPTION OF THE DRAWINGS

FIG. 10 is a diagram that explains the state variables in FIG. 9.

DESCRIPTION OF THE PREFERRED EMBODIMENTS

Figure 1:
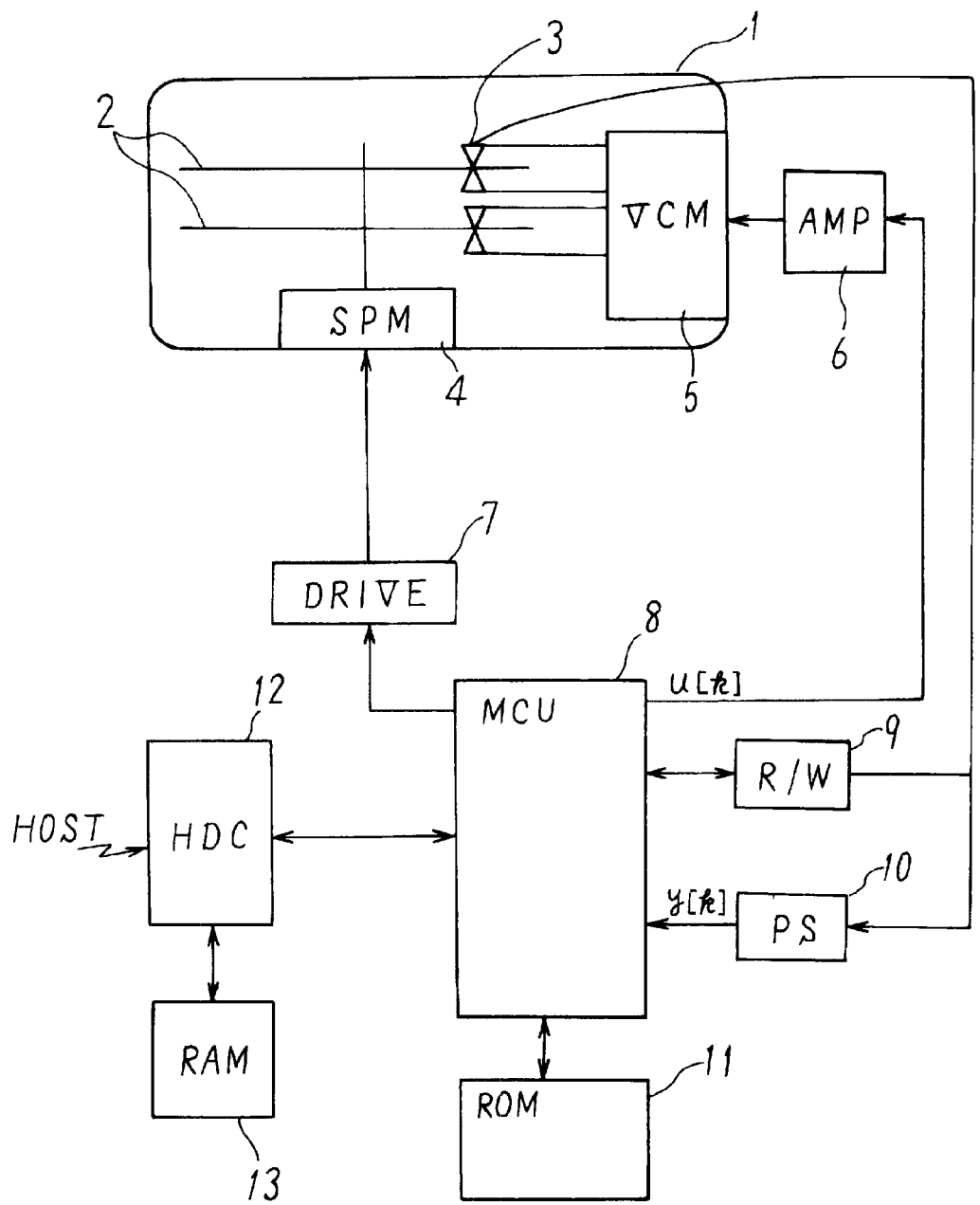
FIG. 1 is a configuration diagram of an embodiment of this invention.
Figure 2:
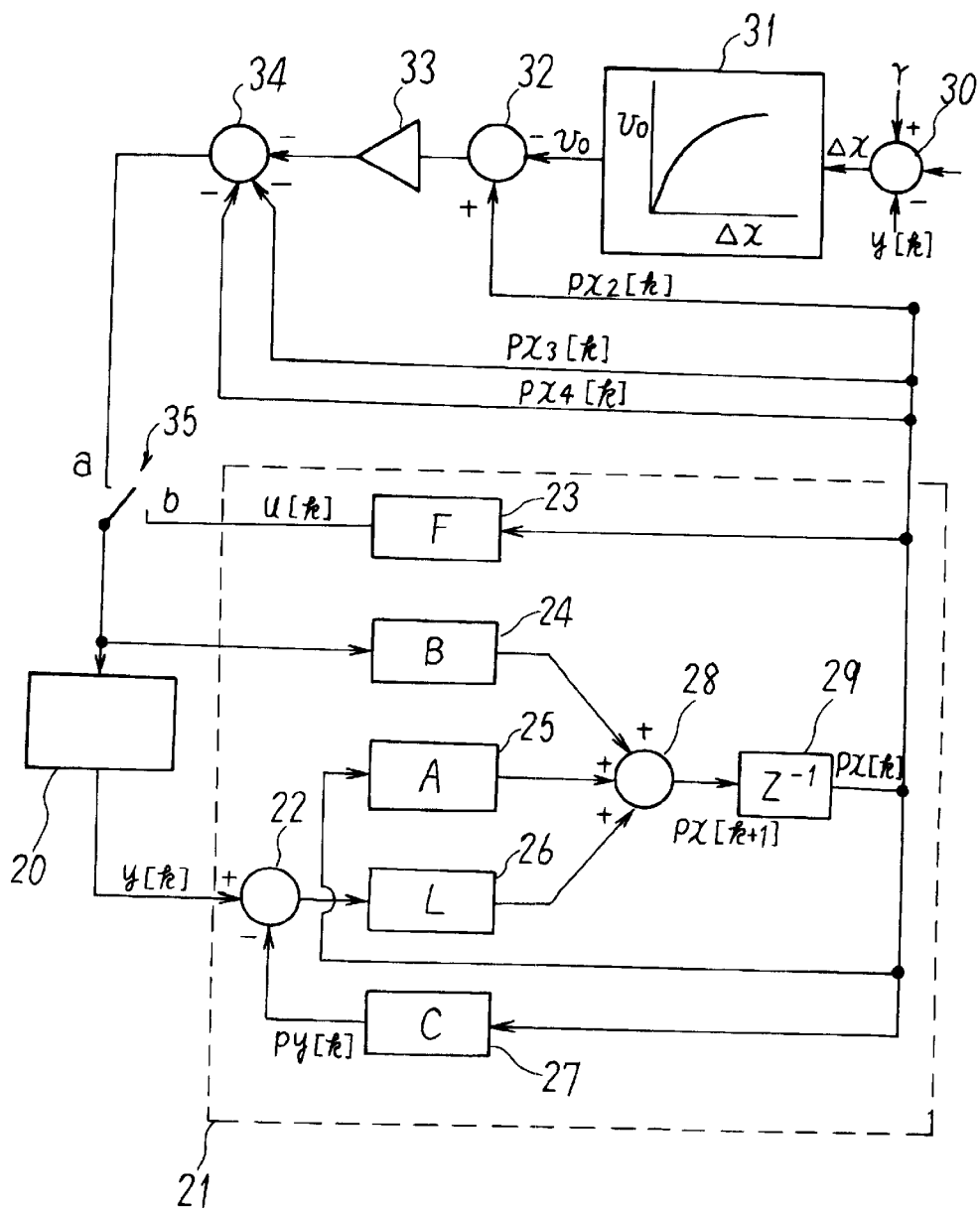
FIG. 2 is a block diagram of the servo control in FIG. 1.
Figure 3:
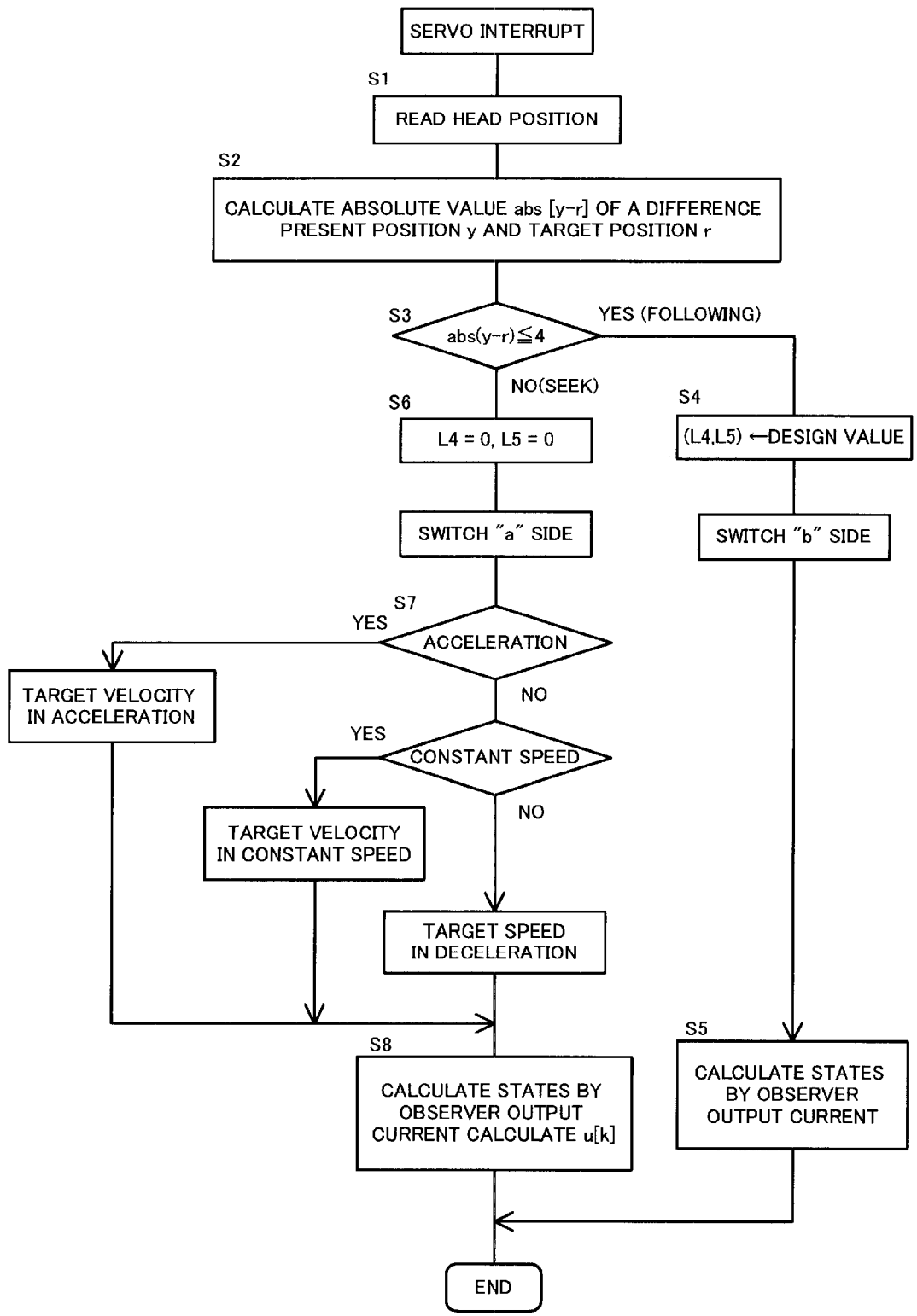
FIG. 3 is a flowchart of the servo control in FIG. 1.
Figure 4:
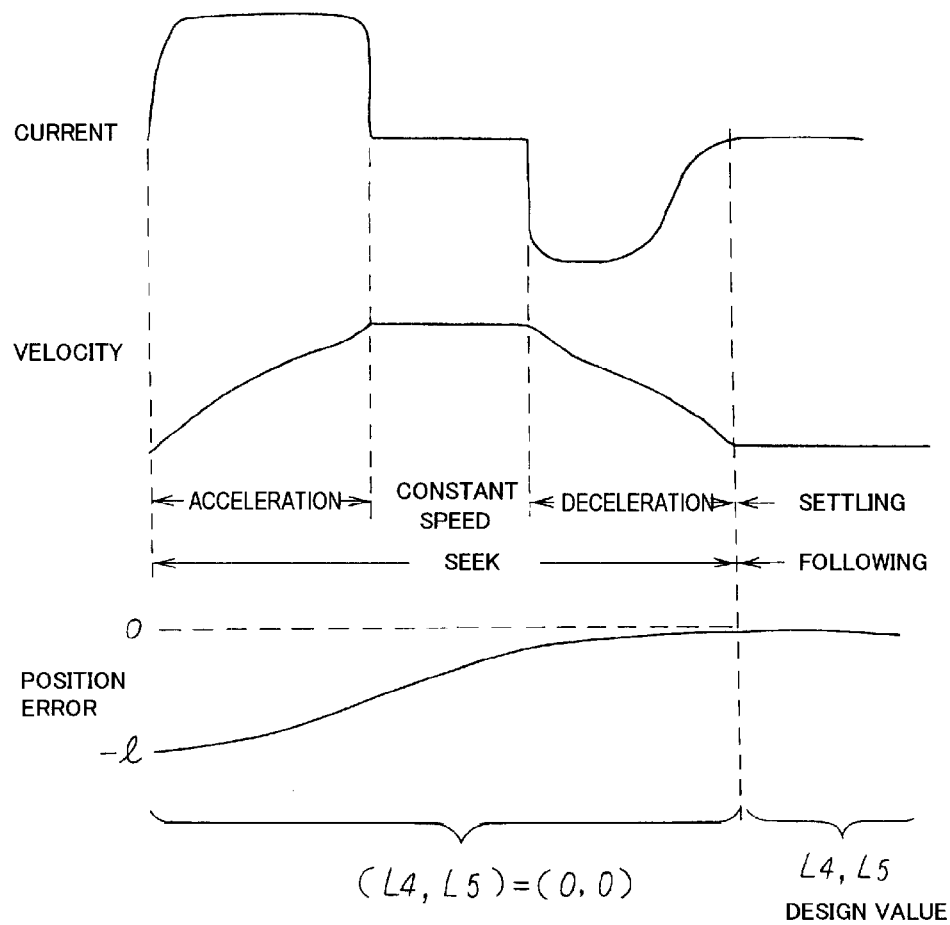
FIG. 4 is a diagram that explains FIG. 3.

FIG. 1 is a configuration diagram of an embodiment of this invention, FIG. 2 is a block diagram of the prediction observer in FIG. 1, FIG. 3 is a flowchart of the servo control process and FIG. 4 is a diagram that explains an embodiment of the invention.

As shown in FIG. 1, a magnetic disk drive 1 comprises a magnetic disk 2 and magnetic heads 3. The magnetic disk 2 comprises data surfaces that are embedded the servo signal on the data tracks. The magnetic head 3 reads information from or writes information to the magnetic disk 2. The magnetic disk 2 is rotated by a spindle motor 4.

A voice coil motor (VCM) 5 moves the magnetic heat 3 in a direction that crosses the tracks on the magnetic disk 2. A power amp 6 drives the VCM 5. A spindle-drive circuit 7 drives the spindle motor 4. A control circuit 8 comprises a microprocessor, an analog/digital converter, a digital/analog converter and RAM.

The control circuit (called the processor below) 8 reads the position signal from the magnetic head 3 to detect the current position y[k] of the magnetic head, and then creates a control value (control current value) u[k] that corresponds to the distance between that position and the position being sought.

A read/write circuit 9 control reading and writing of the magnetic head 3 according to instructions from the processor 8. A position detection circuit 10 demodulates the servo signal from the magnetic head 3, and outputs the position signal to the processor 8. A ROM 11 stores the data and program required for processing of the processor 8.

A hard disk controller 12 performs interface control with the host computer. There is RAM 13 in this hard disk controller 12. The RAM 13 stores data from the host computer and data to be sent to the host computer.

FIG. 2 is a block diagram of the servo process that is executed by the processor in FIG. 1. In FIG. 2, the plant 20 shows the part that performs physical positioning of the head in the magnetic disk device, and it comprises an actuator 5, amp 6 and the magnetic head 3. A prediction observer (estimator) 21 estimates the next position, velocity, bias and eccentricity states from the current states, and outputs a control current.

The position signal (servo signal) y[k] that is read by the magnetic head 3 is output from the plant 20. In the observer 21, an error computing unit 22 calculates the error (y[k]−px1[k]) between the position signal y[k] and the estimated position py[k] (=px1[k]). This error is then input to a fourth gain multiplier 26. The gain multiplier 26 multiplier multiplies this error by the estimation gain L (L1 to L5) (see equation (12)).

A second gain multiplier 24 multiplies the control current u[k] by a coefficient B (see equation (12)). A third multiplier 25 multiplies the state signal px[k] of the current sample by a coefficient A (see equation(12)). And adder 28 adds the outputs of the three adders 24 to 26. By doing this, the state signal px[k+1] for the next sample of equation (12) is output.

This state signal px[k+1] for the next sample is delayed one sample by the delay circuit 29, to obtain the state signal px[k] of the current sample. This state signal px[k] is multiplied by a feedback coefficient C by a fifth multiplier 27. By doing this, the estimated position py[k] of the current sample given by equation (13) is obtained.

Furthermore, the state signal px[k] is multiplied by a feedback coefficient F by a first multiplier 23. By doing this, the current control current u[k] given by equation (14) is obtained. This control current u[k] is supplied to the plant 20.

An error calculator 30 calculates the position error Δx between the current position y[k] and the target position r. The current position y[k] is given from the plant 20. A target velocity generator 31 generates the target velocity v0 from the position error Δx. A velocity calculator 32 calculates difference in velocity between the target velocity v0 and the estimated velocity px2[k] from the observer 21.

A gain multiplier 33 multiplies the velocity difference by a velocity gain C0. A compensator 34 adds the velocity difference, the estimated bias current px3[k] from the prediction observer 21 and the estimated amount of eccentricity px4[k] from the prediction observer 21, inverts it and outputs it as the control current u[k]. The control output u[k] during seeking is given by equation (17) below.

$$u[k] = -C_0 (V_0 - PX_2[k]) - PX_3[k] - PX_4[k] \quad (17)$$

A switch 35 selects the output of the compensator 34 during seeking, and selects the output of the prediction observer 21 during following. These blocks 21 to 35 are realized by the programs of the processor 8.

The servo interrupt process is explained by FIG. 3 and FIG. 4.

(S1) When a servo interrupt (servo gate signal) is given to the processor 8, the processor 8 reads the position signal y[k] from the position detection circuit 10.

(S2) The processor 8 calculates the difference between the target position r and the current position (position signal) y[k].

(S3) The processor 8 determines whether the absolute value abs[y−r] is less than four tracks. Here, the judgment criteria for seeking and following is four tracks. When the absolute value abs[y−r] is four tracks or less then it is determined that following is in progress, and operation advances to step S4. When the absolute value abs[y−r] is more than 4 tracks, then it is determined that seeking is in progress, and operation advances to step S6.

(S4) When determined to be following, the processor 8 replaces the eccentricity estimation gain L4, L5 of block 26 of the prediction observer 21 with the design value. This eccentricity estimation gain L4, L5 is designed such that the error (y[k]−px1[k])converges to zero during following. Also, the processor 8 connects the switch 35 to the 'b' switch.

(S5) The processor 8 calculates the state by the prediction observer. In other words using the aforementioned equation (12), it uses the prediction state px[k] from the previous sample and error (y[k]−px1[k]) to calculate the prediction state px[k+1](px1[k+1] to px5[k+1]) for the next sample.

Next, using equation (14), it uses the prediction state px[k] of the previous sample to calculate the next control current u[k]. In addition, it outputs the control current u[k] to the plant 20 (amp 6). Also, it ends this servo interrupt.

(S6) When determined to be seeking, the processor 8 replaces the eccentricity estimation gain L4, L5 of block 26 of the prediction observer 21 with '0'. Also, the processor 8 connects the switch to the 'a' side. The state equation that is calculated in step S8 becomes equation (15).

(S7) The absolute value abs [y−r] mentioned above, indicates the number of remaining tracks. Also, depending on the size of the absolute value abs[y−r], determines whether it is an acceleration, constant velocity or deceleration interval. When it is an acceleration interval, the target velocity for the acceleration interval is generated by the velocity generator 31. Moreover, when it is a constant velocity interval, the target velocity for the constant velocity interval is generated by the velocity generator 31. Furthermore, when it is a deceleration interval, the target velocity for the deceleration interval is generated by the velocity generator 31.

(S8) The processor 8 performs state calculation with the prediction observer. In other words, using equation (15), it uses the prediction state px[k] of the previous sample and the error (y[k]−px1[k]) to calculate the prediction state px[k+1](px1[k+1] to px5[k+1]) for the next sample. When doing this, as shown in equation (15), the eccentricity estimation gain L4, L5 is zero.

Next, using equation (14), it uses the prediction state px[k] for the previous sample to calculate the control current u[k] as a state variable. When seeking, this control current is saved as a state variable, and is not used as output. Furthermore, using equation (17), it uses the velocity error and the prediction state px[k] of the previous sample to calculated the control current u[k]. When seeking, the control current u[k] that is calculated using equation (17) is output to the plant 20.

In this way, as shown in FIG. 4, when seeing, the estimated eccentricity gain L4. L5 of the observer 21 is made smaller than the eccentricity estimation gain during following so it is possible to calculate an estimated eccentricity signal that is not affected by the error between the detected position and the estimated position. Therefore, it is possible to correct the eccentricity during seeking without being affected by the error.

It is preferable for the eccentricity estimation gains L4 and L5 of the observer 21 during seeking to set zero, however the gains can be a value near zero.

Figure 5:
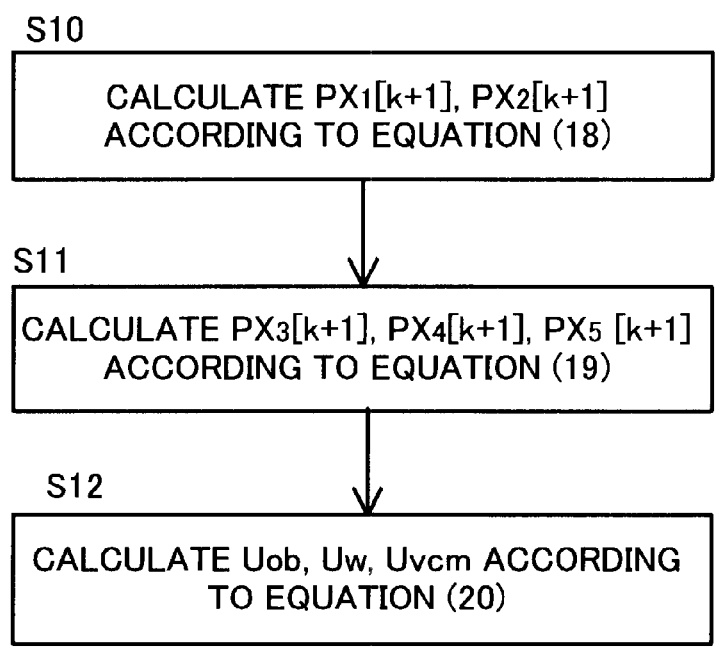
FIG. 5 is a flowchart of the calculation process in FIG. 3.

FIG. 5 is a flowchart of the process of an example of the observer in FIG. 2 that has been transformed. The change in the calculation process of the prediction observer will be explained. The equations (12) and (14) for calculating the state px[k+1] of the next sample and control current u[k]

become 5 dimensional. Therefore, the amount of calculations increases, so the calculation for estimating the actuator operation and the calculation for estimating the external disturbance are separated.

In other words, equation (12) is separated into equations (18) and (19) below.

$$\begin{pmatrix} PX_1[K+1] \\ PX_2[K+1] \end{pmatrix} = \begin{pmatrix} 1 & T \\ 0 & 1 \end{pmatrix}\begin{pmatrix} PX_1[K] \\ PX_2[K] \end{pmatrix} + Kp\begin{pmatrix} T^2/2 \\ T \end{pmatrix}u_{ob}[k] + \begin{pmatrix} L_1 \\ L_2 \end{pmatrix}(y[k]-px_1[k]), \quad (18)$$

$$\begin{pmatrix} PX_3[K+1] \\ PX_4[K+1] \\ PX_5[K+1] \end{pmatrix} = \begin{pmatrix} 1 & 0 & 0 \\ 0 & \cos(\omega_0 T) & -\sin(\omega_0 T) \\ 0 & \sin(\omega_0 T) & \cos(\omega_0 T) \end{pmatrix}\begin{pmatrix} PX_3[K] \\ PX_4[K] \\ PX_5[K] \end{pmatrix} + \begin{pmatrix} L_3 \\ L_4 \\ L_5 \end{pmatrix}(y[k]-px_1[k]), \quad (19)$$

Equation (18) estimates the actuator operation, and equation (19) estimates the external disturbance (bias, eccentricity).

Similarly, the control current (state) u(k) is separated into the control signal uob from the calculation that estimates the actuator operation, and the control current uw from the calculation that estimates the external disturbance. Also, the control current uvcm is obtained by adding the control current uob and control current uw. In other words, equation (14) is transformed to equation (20).

$$uob = -(F_1 \; F_2)\begin{pmatrix} PX_1[K] \\ PX_2[K] \end{pmatrix}, \quad (20)$$

$$uw = -(1 \; 1 \; 0)\begin{pmatrix} PX_3[K] \\ PX_4[K] \\ PX_5[K] \end{pmatrix}$$

$$uvcm = uob + uw.$$

It must be noticed that the control current uob in equation (18) is the control current uob from the calculation for estimating the actuator operation in equation (20).

This will be explained using the flowchart in FIG. 5.

(S10) From equation (18), the state variables px1[k+1] and px2[k+1] for the next sample are calculated.

(S11) Next, from equation (19), the state variables px3[k+1], px4[k+1] and px5[k+1] for the next sample are calculated.

(S12) Furthermore, with equation (20), the control current uob that estimates the actuator operation, and the control current uw that estimates the disturbance are calculated. In addition, the control current uvcm is obtained by adding the control current uob with the control current uw.

When the calculation for estimating the disturbance is separate in this way, it is possible to separate the calculation for estimating the actuator operation and the calculation for estimating the disturbance, and since there is one a maximum of three equations, it is possible to reduce the number of adding operations. This makes it possible to calculate the state at high speed.

Figure 6:
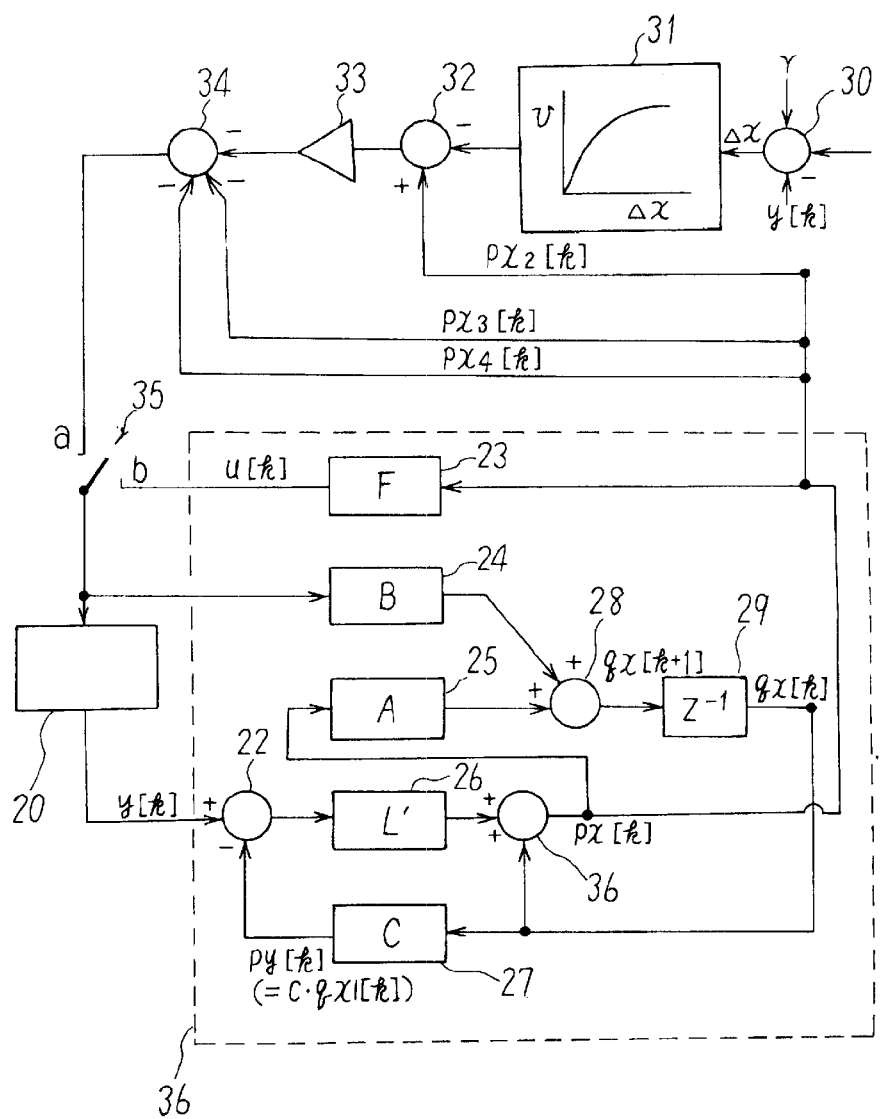
FIG. 6 is a block diagram of the servo controller of another embodiment of this invention.
Figure 7:
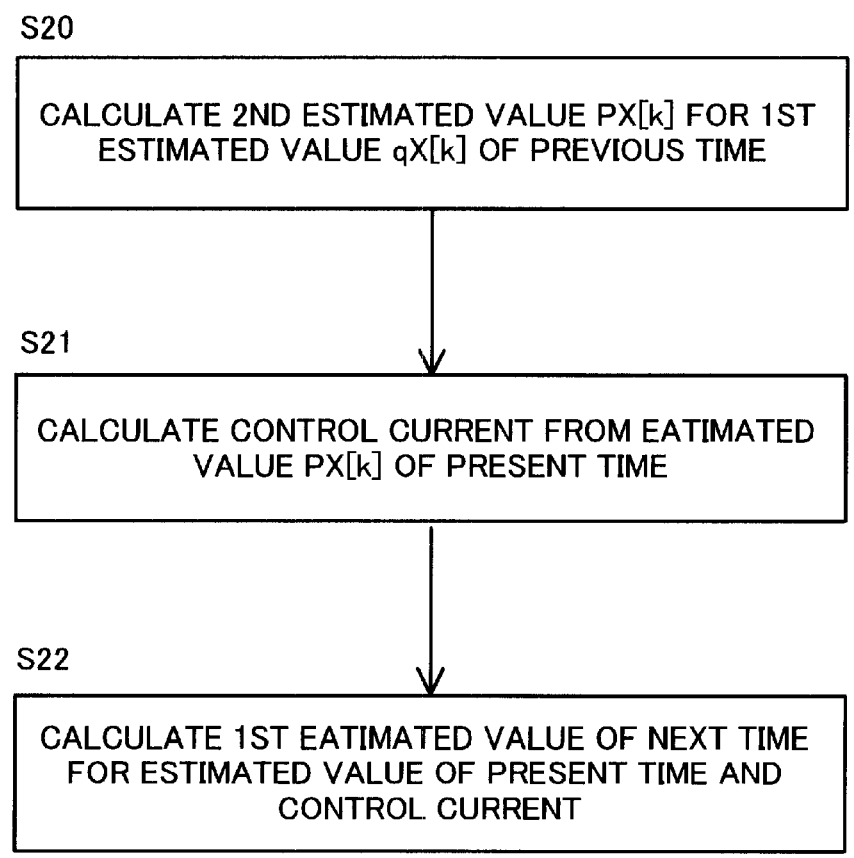
FIG. 7 is a flowchart of the calculation process in FIG. 6.

Next, an example of modifying the observer is explained. In FIG. 2, a prediction observer is explained, however, using a current observer is also possible. FIG. 6 is a block diagram of another servo process executed by the processor in FIG. 1, and FIG. 7 is a flowchart of the calculation process of the current observer in FIG. 6.

FIG. 2 shows a prediction observer, however FIG. 6 shows the configuration of a current observer. The items in FIG. 6 that are the same as those in FIG. 2 are indicated with the same number.

As is well known, when a prediction observer is defined by equations (12) and (14), the state equations of a current observer are defined by equations (21), (22) and (23) below.

$$\begin{pmatrix} PX_1[K] \\ PX_2[K] \\ PX_3[K] \\ PX_4[K] \\ PX_5[K] \end{pmatrix} = \begin{pmatrix} qX_1[K] \\ qX_2[K] \\ qX_3[K] \\ qX_4[K] \\ qX_5[K] \end{pmatrix} + \begin{pmatrix} L'_1 \\ L'_2 \\ L'_3 \\ L'_4 \\ L'_5 \end{pmatrix}(y[k]-qX_1[k]) \quad (21)$$

$$uob = -(F_1 \; F_2)\begin{pmatrix} PX_1[K] \\ PX_2[K] \end{pmatrix}, \; uw = -(1 \; 1 \; 0)\begin{pmatrix} PX_3[K] \\ PX_4[K] \\ PX_5[K] \end{pmatrix},$$

$$uvcm = uob + uw, \quad (22)$$

$$\begin{pmatrix} qX_1[K+1] \\ qX_2[K+1] \end{pmatrix} = \begin{pmatrix} 1 & T \\ 0 & 1 \end{pmatrix}\begin{pmatrix} PX_1[K] \\ PX_2[K] \end{pmatrix} + Kp\begin{pmatrix} T^2/2 \\ T \end{pmatrix}uob[k] \quad (23)$$

$$\begin{pmatrix} qX_3[K+1] \\ qX_4[K+1] \\ qX_5[K+1] \end{pmatrix} = \begin{pmatrix} 1 & 0 & 0 \\ 0 & \cos(\omega_0 T) & -\sin(\omega_0 T) \\ 0 & \sin(\omega_0 T) & \cos(\omega_0 T) \end{pmatrix}\begin{pmatrix} PX_3[K] \\ PX_4[K] \\ PX_5[K] \end{pmatrix}$$

Here, px[k] (px1[k] to px5[k]) are estimated values for the corrected current sample, qx[k] (qx1[k] to qx5[k]) are estimated values for the previous sample, and qx[k+1] (qx1[k+1]to qx5[k+1]) are estimated values for the next sample.

In other words, as shown in equation (21), the estimated values px[k] (px1(k) to px5[k]) for the corrected current sample are found from the error, and the estimated values qx[k] (qx1[k] to qx5[k]) of the previous sample. The estimation gains 'L1'' to 'L5'' in equation (21) differ from the estimation gains 'L1' to 'L5' of the prediction observer.

Moreover, as shown in equation (22), the control current uvcm is obtained from the estimated values px[k] (px1[k]to px5[k]) for the corrected current sample. Equation (22) separates the equation for estimating the actuator and the equation for estimating the disturbance, as shown in equation (20) described above. Finally, as shown in equation (23), the estimated values qx[k+1] (qx1[k+1] to qx5[k+1]) for the next sample are obtained from the estimated values px[k] (px1[k] to px5[k]) for the corrected current sample and the control current uob[k].

When this is shown in a block, it is as shown in FIG. 6. In other words, in FIG. 6, a current observer (estimator) 36 estimates the current state of the position, velocity, bias and eccentricity from the previous state, and outputs a control current.

The position signal (servo signal) y[k] that is read by the magnetic head 3 is output from the plant 20. In the observer 36, the error calculator 22 calculates the error (y[k]−qx1[k]) between the position signal y[k] and the estimated position py[k](=qx1[k]). The error is input to a fourth gain multiplier 26. The gain multiplier 26 multiplies the error by the estimation gain L' (L1' to L5') (see equation (21)).

An adder 36 adds the output of the gain multiplier 26 and the previous estimated state qx[k], to obtain the estimated value px[k] for the corrected current sample. A second multiplier 24 multiplies the control current u[k] by a coefficient B (see equation (23)). A third gain multiplier 25 multiplies the state signal px[k] for the current sample by a coefficient A (see equation (23)). An adder 28 adds the output of the two adders 24 and 25. By doing this the state signal qx[k+1] of the next sample of equation (23) is output.

This state signal qx[k+1] for the next sample, is delayed one sample by a delay circuit 29 to obtain the state signal qx[k] for the current sample. The state signal qx[k] for the previous sample is multiplied by a feedback coefficient C by a fifth multiplier 27. By doing this the estimated position qy[k] for the current sample shown in equation (21) is obtained.

Furthermore, the state signal px[k] of the corrected current sample is multiplied by a feedback coefficient F by a first multiplier 23. In this way, the current control current u[k] shown in equation (22) is obtained. This control current u[k] is then supplied to the plant 20.

An error calculator 30 calculates the position error Δx between the target position r and current position y[k]. The current position y[k] is given from the plant 20. A target velocity generator 31 generates the target velocity v0 from the position error Δx. A velocity difference calculator 32 calculates the velocity difference between the target velocity v0 and the estimated velocity px2[k] of the prediction observer 21.

A gain multiplier 33 multiplies the velocity difference by a velocity gain CO. A compensator 34 adds the velocity difference, the estimated bias current px3[k] of the current observer 36 and the estimated amount of eccentricity px4[k] of the current observer 36, and then inverts it and outputs it as the control current u[k]. The control output u[k] during seeking is given by equation (17).

A switch 35 selects the output of the compensator 34 during seeking, and selects the output of the prediction observer 21 during following. These blocks (22 to 36) are realized by the programs of the processor 8.

In this embodiment as well, the same process as shown in the flowchart in FIG. 3 is performed. The eccentricity estimation gains L4', L5' are set to '0' during seeking, and the eccentricity estimation gains L4', L5' are set to a setting other than '0' during following. Therefore, an explanation of this process will be omitted.

The process of the observer control shown in FIG. 3 is as shown in FIG. 7. This process is explained below.

(S20) As shown in equation (21) the estimated values px[k] (px1[k] to px5[k]) of the corrected current sample is found from the error(y[k]-qx1[k]), estimated values qx[k] (qx1[k]-qx5[k]) of the previous sample and the estimation gains L1' to L5'.

(S21) Next, as shown in equation (22), the control current uvcm is obtained from the estimated values px[k] (px1[k] to px5[k]) of the corrected current sample. Also, the control current uvcm is output to the plant 20.

(S22) Finally, as shown in equation (23), the estimated values qx[k+1] (qx1[k+1] to qx5[k+1]) of the next sample are obtained from the estimated values px[k] (px1[k] to px5[k]) of the corrected current sample and the control current uob[k].

In this example as well, as shown in FIG. 3, the eccentricity estimation gains L4' to L5' are set to zero during seeking. Equation (21) is transformed to equation (24) below.

$$\begin{pmatrix} PX_1[K] \\ PX_2[K] \\ PX_3[K] \\ PX_4[K] \\ PX_5[K] \end{pmatrix} = \begin{pmatrix} qX_1[K] \\ qX_2[K] \\ qX_3[K] \\ qX_4[K] \\ qX_5[K] \end{pmatrix} + \begin{pmatrix} L'_1 \\ L'_2 \\ L'_3 \\ 0 \\ 0 \end{pmatrix}(y[k] - qX_1[k]) \quad (24)$$

The control current uvcm and the estimated values qx[k+1] (qx1[k+1] to qx5[k+1]) of the next sample are calculated from equation (22) and equation (23). In this way, the same effect as the prediction observer is also possible with a current observer. In addition, by constructing a current observer, realization by processor processing becomes easy.

Next, an example of a modified current observer is explained.

Figure 8:
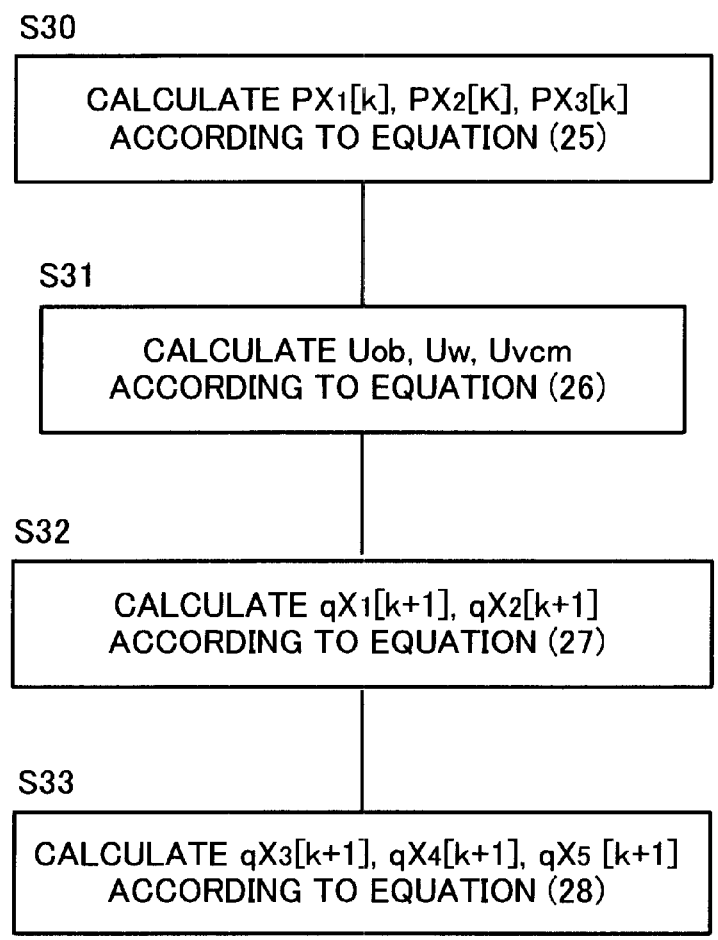
FIG. 8 is a flowchart of another calculation process of the invention.

FIG. 8 is a flowchart of the process of a modified example of the current observer in FIG. 6. The modification in the calculation processes for the current observer will be explained. In the example in FIG. 6, the state px[k+1] of the next sample is calculated by equation (21). However, since the frequency of the eccentricity is low, estimation of the eccentricity by the current observer can be delayed one sample more than the other state variables (position, velocity, bias). In other words, for the eccentricity state, it is possible to estimate the state one sample ahead.

Taking this into consideration, it is possible to estimate the eccentricity by calculating the error (y[k]-qx1[k]) and the eccentricity estimation gains L4' to L5' when calculating the estimated variables for eccentricity values qx4[k+1] and qx5[k+1] of the next sample.

In other words, in equation (21), finding the state variables for eccentricity px4[k] and px5[k] of the current sample is omitted. Therefore, equation (21) is transformed to equation (25) below.

$$\begin{pmatrix} PX_1[K] \\ PX_2[K] \\ PX_3[K] \end{pmatrix} = \begin{pmatrix} qX_1[K] \\ qX_2[K] \\ qX_3[K] \end{pmatrix} + \begin{pmatrix} L'_1 \\ L'_2 \\ L'_3 \end{pmatrix}(y[k] - qX_1[k]) \quad (25)$$

Moreover, the state variables for eccentricity qx4[k] and qx5[k] for the previous sample are used instead of the state variables for eccentricity px4[k] and px5[k] of the current sample to calculate the control current uw. Therefore, equation (22) is transformed to equation (26) below.

$$uob = -(F_1 \ F_2)\begin{pmatrix} PX_1[K] \\ PX_2[K] \end{pmatrix}, \quad (26)$$

$$uw = -(1 \ 1 \ 0)\begin{pmatrix} PX_3[K] \\ qX_4[K] \\ qX_5[K] \end{pmatrix},$$

$$uvcm = uob + uw,$$

Furthermore, equation (27) below is applied without making changes to the estimation equations for the estimated position and estimated velocity in equation (23). However, in equation (23), calculation of the error (y[k]-qx1[k]) and eccentricity estimation gains L4' and L5, are added to the eccentricity estimation equation, and becomes equation (28) below.

$$\begin{pmatrix} qX_1[K+1] \\ qX_2[K+1] \end{pmatrix} = \begin{pmatrix} 1 & T \\ 0 & 1 \end{pmatrix} \begin{pmatrix} PX_1[K] \\ PX_2[K] \end{pmatrix} + Kp \begin{pmatrix} T^2/2 \\ T \end{pmatrix} uob[k], \quad (27)$$

$$\begin{pmatrix} qX_3[K+1] \\ qX_4[K+1] \\ qX_5[K+1] \end{pmatrix} = \quad (28)$$

$$\begin{pmatrix} 1 & 0 & 0 \\ 0 & \cos(\omega_0 T) & -\sin(\omega_0 T) \\ 0 & \sin(\omega_0 T) & \cos(\omega_0 T) \end{pmatrix} \begin{pmatrix} PX_3[K] \\ PX_4[K] \\ PX_5[K] \end{pmatrix} + \begin{pmatrix} 0 \\ L'_4 \\ L'_5 \end{pmatrix} (y[k] - qX_1[k])$$

In this way, since the eccentricity estimation values for the previous sample are used in the calculation of the control current, it is not necessary to calculate the eccentricity estimation value for the current sample. Instead, the error is reflected on the eccentricity estimation value for the next sample.

By doing this, it is not necessary to calculate the state variable for eccentricity before outputting the current to the actuator. Also, it is possible to quicken the time of the current output.

This process will be explained with the process flowchart in FIG. 8.

(S30) The state variables px1[k], px2[k] and px3[k] of the current sample are calculated from equation (25).

(S31) The control current uob that estimates the actuator operation and the control current uw that estimates the disturbance are calculated with equation (26). Also, the control current uvcm is obtained by adding the control current uob and the control current uw.

(S32) The state variables qx1[k+1] and qx2[k+1] for the next sample are calculated with equation (27).

(S33) The state variables qx3[k+1], qx4[k+1] and qx5[k+1] for the next sample are calculated with equation (28).

Here, in equation (26), similar to the embodiment shown in FIG. 5, the control current (state) u[k] is separated into the control current uob from the calculation for estimating the actuator operation, and the control current uw from the calculation for estimating the disturbance. The control current uvcm is obtained by adding the control current uob and the control current uw.

Moreover, as shown in equation (27) and equation (28), the calculation for estimating the actuator operation (equation (27)) and the calculation for estimating the disturbance, including the eccentricity, (equation (28)) are separated. By separating the calculation for estimating the disturbance in this way, it is possible to separate the calculation for estimating the actuator operation and the calculation for estimating the disturbance, and since the equation is at most 3-dimensional, it is possible to reduce the number of summation operations. This makes it possible to calculate the state at high speed.

The method of this embodiment becomes even more effective as the frequency that is the object of eccentricity correction becomes two or three. For example, when eccentricity correction is performed for a cycle ω0 and also a cycle double that 2ω 0, the state variables of the eccentricity (x6, x7) are added to (x4, x5).

In this case, the state variables of equation (28) can be increased from (x3, x4, x5) to (x3, x4, x5, x6, x7). Therefore, equation (28) is transformed to equation (29) below.

$$\begin{pmatrix} qX_3[K+1] \\ qX_4[K+1] \\ qX_5[K+1] \\ qX_6[K+1] \\ qX_7[K+1] \end{pmatrix} = \quad (29)$$

$$\begin{pmatrix} 1 & 0 & 0 & 0 & 0 \\ 0 & \cos(\omega_0 T) & -\sin(\omega_0 T) & 0 & 0 \\ 0 & \sin(\omega_0 T) & \cos(\omega_0 T) & 0 & 0 \\ 0 & 0 & 0 & \cos(2\omega_0 T) & -\sin(2\omega_0 T) \\ 0 & 0 & 0 & \sin(2\omega_0 T) & \cos(2\omega_0 T) \end{pmatrix} \begin{pmatrix} PX_3[K] \\ PX_4[K] \\ PX_5[K] \\ PX_6[K] \\ PX_7[K] \end{pmatrix} +$$

$$\begin{pmatrix} 0 \\ L'_4 \\ L'_5 \\ L'_6 \\ L'_7 \end{pmatrix} (y[k] - qX_1[k])$$

In this way, even when the estimation states of the eccentricity are increased, the calculation performed before calculating the control current is still that of equation (25), and even when the estimation states of the eccentricity are increased, it is possible to output the control current quickly.

Figure 9:
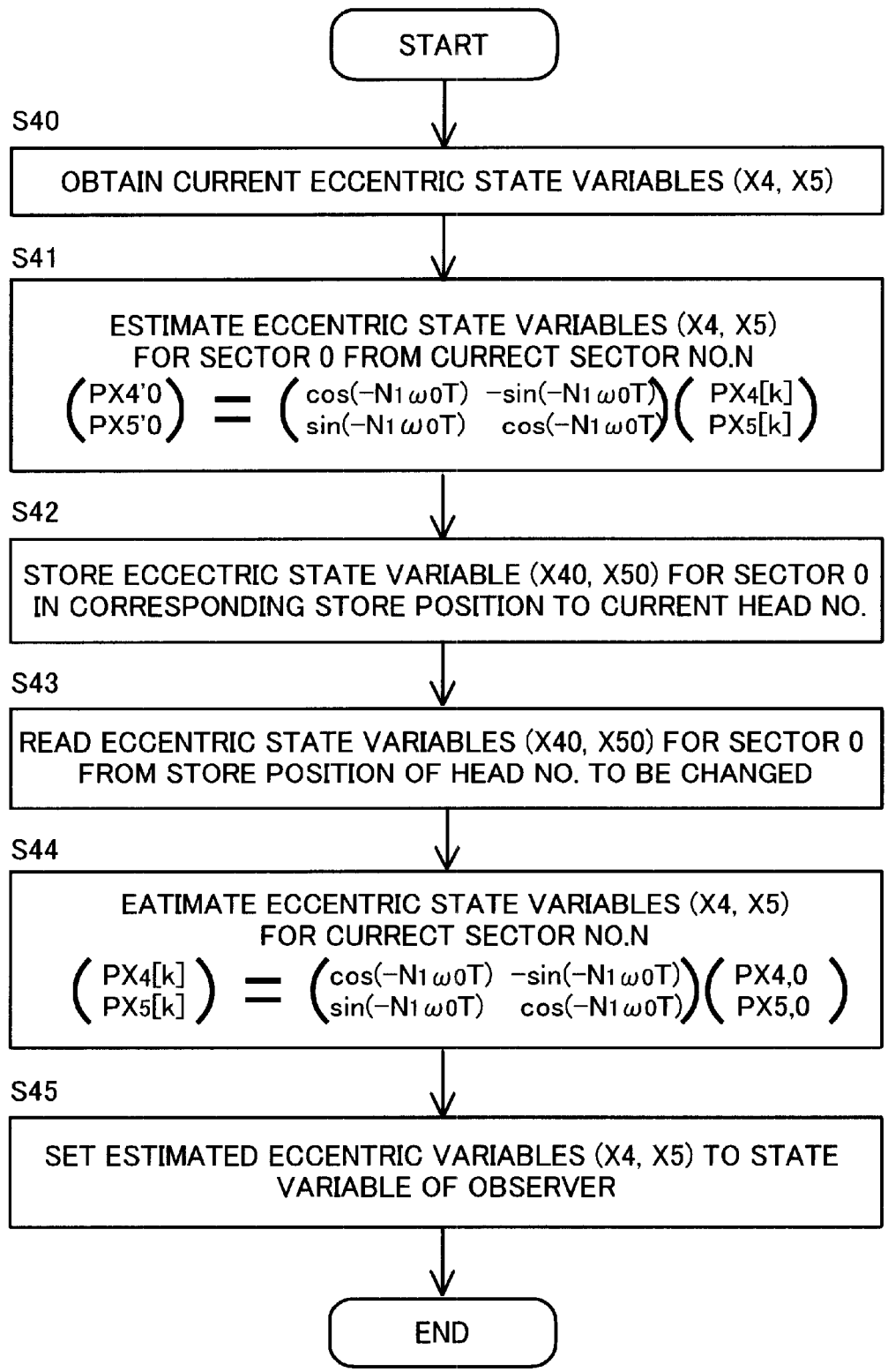
FIG. 9 is a flowchart of the head-change process in FIG. 1.
Figure 11:
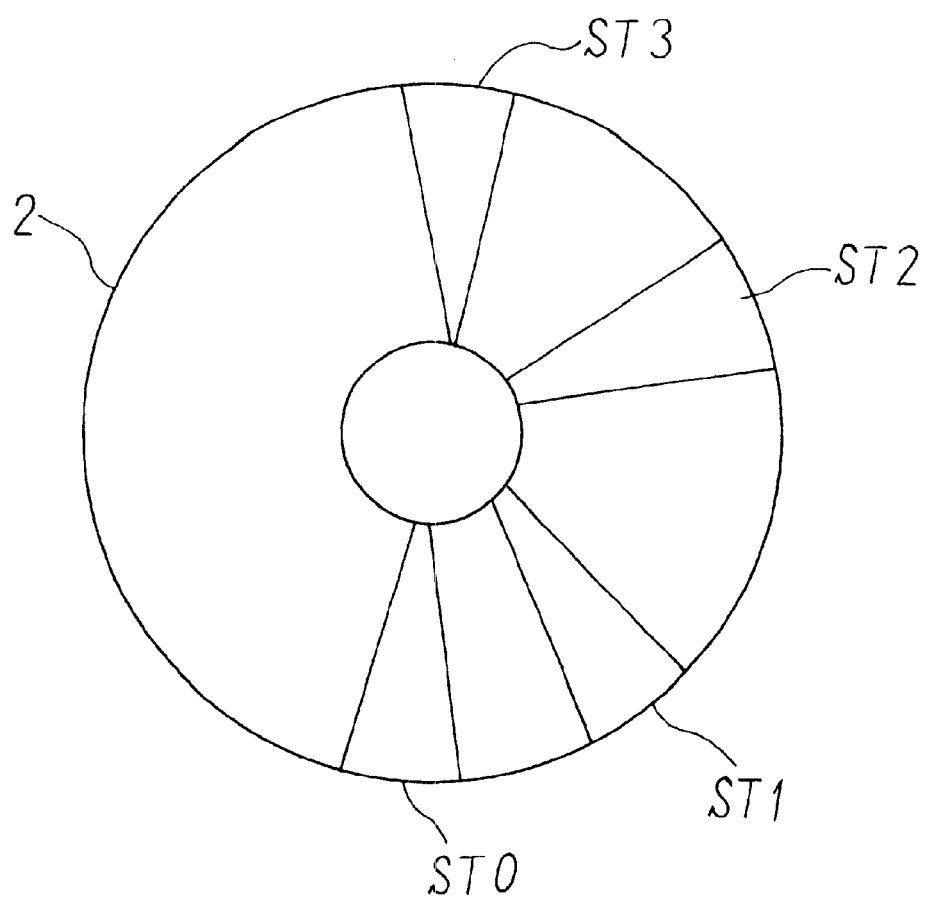
FIG. 11 is a diagram that explains the head-change process in FIG. 9.
Figure 12:
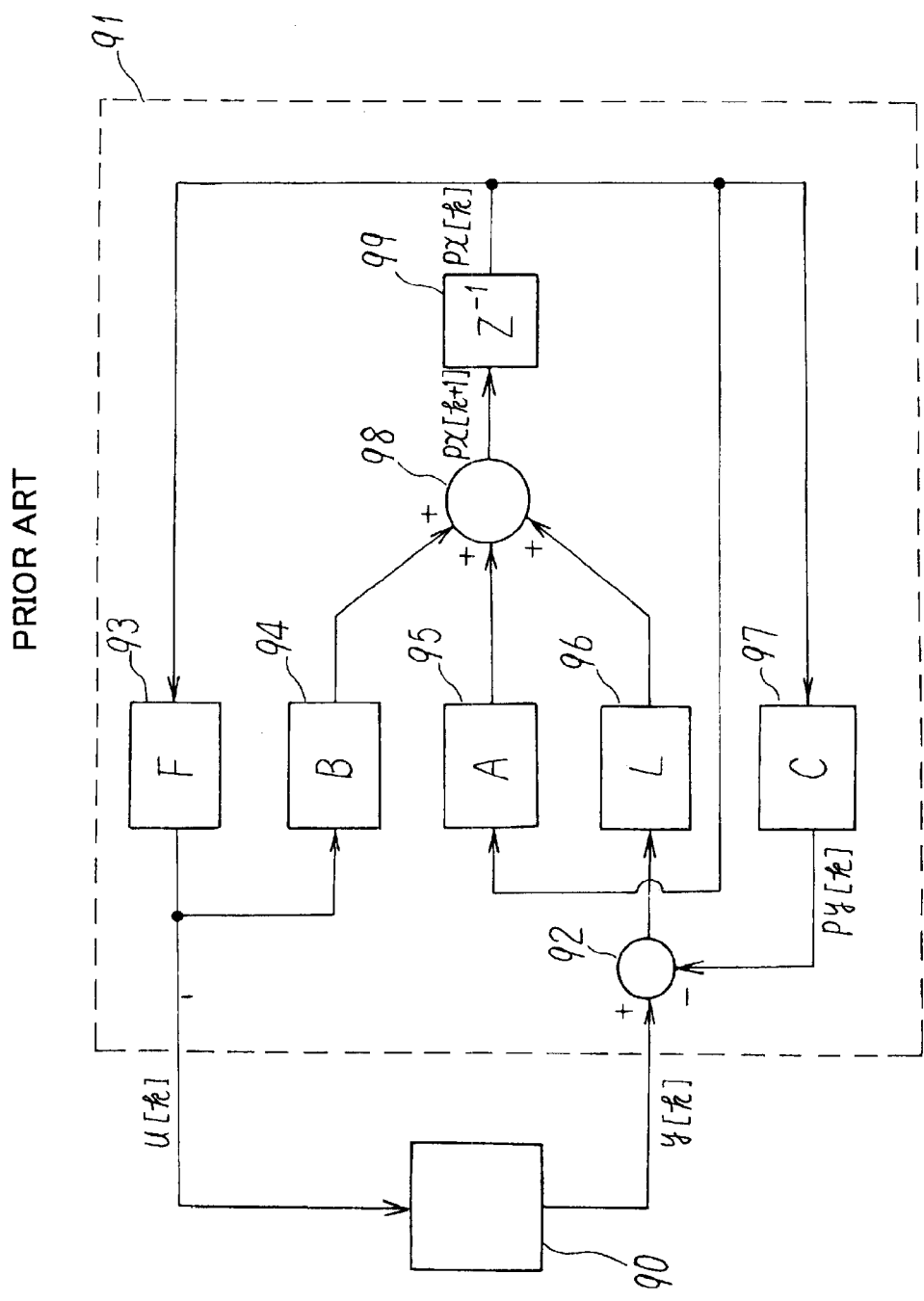
FIG. 12 is a configuration diagram of the prior art.
Figure 13:
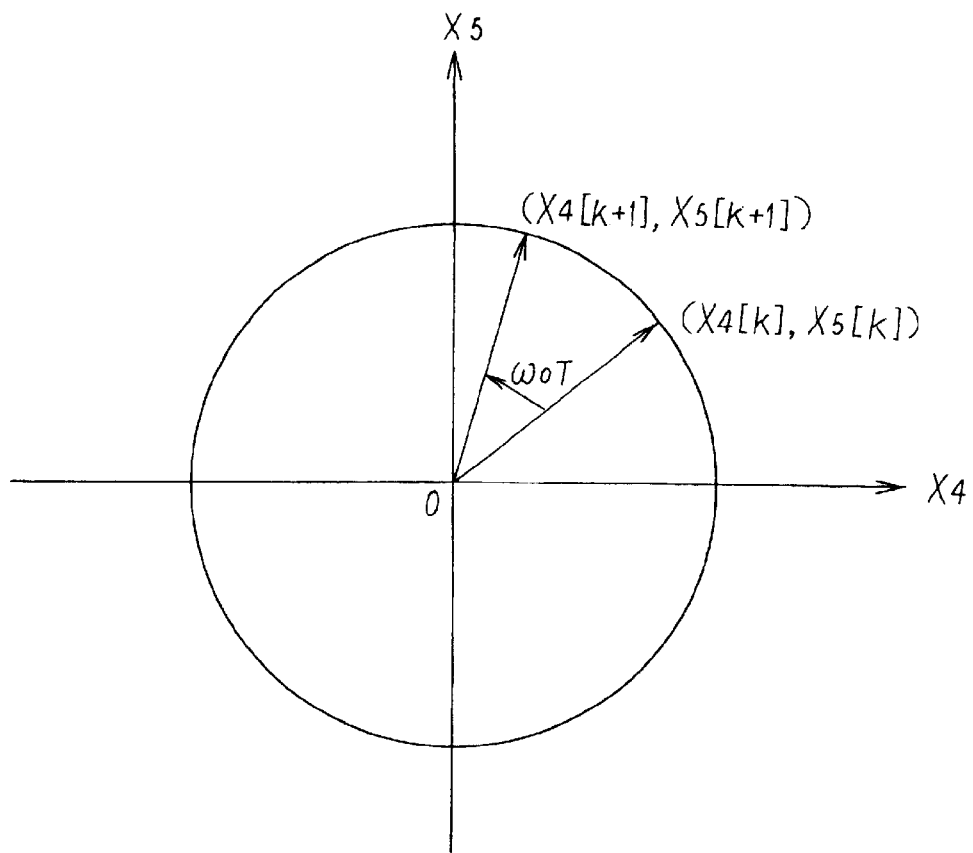
FIG. 13 is a diagram that explains the prior art.

Next, the operation for changing the head is explained. FIG. 9 is a flowchart of the process for changing the head in another embodiment of the invention, FIG. 10 is a diagram explaining the state variables in FIG. 9, and FIG. 11 is a diagram explaining the head changing operation.

The waveform of the eccentricity differs for each surface of the magnetic disk. Therefore, the wave form of the eccentricity differs for each head. Also, the state variables of the eccentricity differ for each head. When using the observer described above, it is necessary to initialize the state eccentricity variables x4, x5 of the observer when changing the head. However, when the initial value is '0', it takes time for the estimated eccentricity value to follow the eccentricity.

Therefore, as shown in FIG. 10, the state variables x4, x5 for each head are stored in the memory (not shown in the figure) of the processor 8 (see FIG. 1). Also, when there is an instruction to change the head, the current state variables for the eccentricity are stored in the memory. The state variables of the eccentricity that are stored in memory for the head to be changed to are read, and set in the observer. By doing this it is possible to immediately initialize the observer.

This process is explained in detail using FIG. 9.

(S40) The processor 8 obtains the current state variables (x4, x5) for the eccentricity of the observers 21, 36 according to an instruction from the host to change the magnetic head.

(S41) The processor 8 converts the state variables (x4, x5) for the eccentricity of this current sector number N1 to state variables (x40, x50) for the eccentricity of sector number 0. Conversion is performed by equation (30) below.

$$\begin{pmatrix} PX_{4'0} \\ PX_{5'0} \end{pmatrix} = \begin{pmatrix} \cos(N_1 \omega_0 T) & -\sin(N_1 \omega_0 T) \\ \sin(N_1 \omega_0 T) & \cos(N_1 \omega_0 T) \end{pmatrix} \begin{pmatrix} PX_4[K] \\ PX_5[K] \end{pmatrix} \quad (30)$$

In other words, as shown in FIG. 11, there are a plurality of sectors ST0 to STn around the magnetic disk 2. The current state variables are for the sector (sector no. N1)

where the magnetic head is currently located, so the current state variables are converted to the state variables for the reference sector (in this case, sector No. 0).

(S42) The processor 8 stores the converted state variables (x40, x50) for the eccentricity in the memory area that corresponds to the current head number.

(S43) The processor 8 reads from memory the state variables (x40, x50) for the eccentricity of the head number of the head to be changed to.

(S44) The state variables that are read from memory are values for the reference sector (sector No. 0) so the processor 8 uses equation (31) below to convert them to state variables (px4, px5) for the eccentricity that correspond to the current sector (sector No. 2).

$$\begin{pmatrix} PX_4[K] \\ PX_5[K] \end{pmatrix} = \begin{pmatrix} \cos(N_2\omega_0 T) & -\sin(N_2\omega_0 T) \\ \sin(N_2\omega_0 T) & \cos(N_2\omega_0 T) \end{pmatrix} \begin{pmatrix} PX_{4\,0} \\ PX_{4\,0} \end{pmatrix} \quad (31)$$

(S45) The processor 8 sets these state variables (px4, px5) for the eccentricity as the state variables for the observers 21, 36.

By doing this, it is possible to immediately follow the eccentricity even when changing the head. When the state variables are not converted to the values of the reference sector position, the sector number is further stored in memory.

The amplitude of the eccentricity correction current is calculated from the state variables (px4, px5) that are stored in memory using the equation square ($px4^2+px5^2$). This corresponds with the amount of eccentricity. These state variables, the amplitude or the amount of eccentricity is such that they can be read from a host such as a computer.

Even though it is possible to correct the eccentricity, it is not possible to correct infinitely large eccentricity. Therefore, the host sends a warning to the user when the eccentricity is large. Particularly, in the case of a disk device that is installed in a portable computer and that is susceptible to impact, a warning is issued when the eccentricity data exceeds a pre-determined allowable limit, and saves the data on a separate disk.

In addition to the embodiments of the invention described above, the invention can be changed as follows:

(1) A magnetic disk device was explained as the disk storage device, however the invention can also be applied to other disk storage devices such as a magneto-optical disk device or optical disk device.

(2) The observer was shown by processor processing, however it can also be constructed by a digital circuit.

The preferred embodiments of the present invention have been explained, however the invention is not limited to these embodiments and can be embodied in various forms within the scope of the present invention.

Industrial Application

As described above, this invention has the following effect.

(1) The eccentricity estimation gains L4, L5 of the eccentricity estimation observer during seeking are made extremely small when compared with those during following to prevent the position error from affecting the estimated amount of eccentricity. Therefore, it is possible to speed up the convergence operation at the end of seeking.

(2) Moreover, since eccentricity correction is performed during seeking, there is no loss instability of the seek operation.

What is claimed is:

1. A control method for a disk storage device, having a disk storage medium, a head for reading information on said disk storage medium, an actuator for moving said head, and a control circuit using eccentricity estimation observer control including a model of said actuator and a model of the eccentricity for calculating a control signal for driving said actuator based on a position signal that is read from said disk storage device medium by said head, comprising:

a step of selecting a first eccentricity estimation gain during seek control, and of selecting a second eccentricity estimation gain during following control; and a step of calculating state signals, that include estimated position, estimated velocity, estimated bias and estimated eccentricity signals, based on an error between said position signal and said estimated position signal, the actuator estimation gain for estimating actuator operation, and said selected eccentricity estimation gain during both said seek control and said following control; and a step of calculating said control signal from said calculated state signals.

2. The control method for a disk storage device of claim 1 wherein said selection step comprises:

a step of setting said first eccentricity estimation gain to '0' during said seek control.

3. The control method for a disk storage device of claim 1 further comprising:

a step of detecting the position error between the target position and current position; and a step of comparing said position error with a specified value and determining that control is following control when said position error is within the specified value, and determining that control is seek control when said position error exceeds the specified value.

4. The control method for a disk storage device of claim 1 wherein said calculation step comprises:

a first calculation step of calculating the estimated position signal, estimated velocity signal and estimated eccentricity signal for the next sample from said error and the estimated position signal, estimated velocity signal and estimated eccentricity signal for the current sample as well as from said actuator estimation gain and said eccentricity estimation gain; and a second calculation step of calculating said control current from said estimated position signal, estimated velocity signal and estimated eccentricity signal for the current sample.

5. The control method for a disk storage device of claim 4 wherein said first calculation step comprises:

a third calculation step of calculating the estimated position signal and estimated velocity signal for the next sample from said error and the estimated position signal and estimated velocity signal for the current sample, as well as from said actuator estimation gain; and a fourth calculation step of calculating the estimated eccentricity signal for the next sample from said error and the estimated eccentricity signal for the current sample, as well as from said eccentricity estimation gain.

6. The control method for a disk storage device of claim 1 wherein said calculation step comprises:

a fifth calculation step of calculating a corrected state signal based on said error, previously calculated state signal, said actuator estimation gain and said eccentricity estimation gain;

a sixth calculation step of calculating said control signal from said corrected state signal; and a seventh calculation step of calculating the next state signal from said control signal and said corrected state signal.

7. The control method for a disk storage device of claim 6 wherein said fifth calculation step comprises:

an eighth calculation step of calculating a corrected estimated position signal and estimated velocity signal from said error, the estimated position signal and estimated velocity signal for the previous sample, as well as from said actuator estimation gain; and a ninth calculation step of calculating the estimated eccentricity signal for the next sample from said error, the estimated eccentricity signal for the previous sample and from said eccentricity estimation gain.

8. The control method for a disk storage device of claim 1 wherein said calculation step comprises:

a tenth calculation step of calculating the corrected estimated position signal and estimated velocity signal from said error, the previous estimated position signal and previous estimated velocity signal, and said actuator estimation gain;

an eleventh calculation step of calculating said control signal based on said corrected estimated position signal and previous estimated eccentricity signal; and a twelfth calculation step of calculating the next estimated position signal, next estimated velocity signal and next estimated eccentricity signal based on said error, said corrected estimated position signal and said corrected estimated velocity signal and previous estimated eccentricity signal.

9. The control method for a disk storage device of claim 1 comprising:

a save step of saving in memory said estimated eccentricity signal for the head before changing, according to a head change instruction; and an execution step of reading said estimated eccentricity signal for said head before change, and executing said calculation steps with said read estimated eccentricity signal as the initial value.

10. The control method for a disk storage device of claim 9 wherein said save step comprises:

a step of saving said converted value after said estimated eccentricity signal has been converted to the estimated eccentricity signal for the reference sector; and wherein said execution step comprises:

a step of correcting said stored estimated eccentricity signal to the estimated eccentricity signal for the current sector.

11. A control device for a disk storage device having:

a disk storage medium;

a head for reading information on said storage medium;

an actuator for moving said head; and a control circuit using eccentricity estimation observer control including a model of said actuator and a model of the eccentricity for calculating a control signal for driving said actuator based on a position signal that is read from said disk storage medium by said head; wherein said control circuit selects a first eccentricity estimation gain during seek control, and selects a second eccentricity estimation gain during following control; and calculates state signals, that include estimated position, estimated velocity, estimated bias and estimated eccentricity signals, based on an error between said position signal and said estimated position signal, the actuator estimation gain for estimating actuator operation, and said selected eccentricity estimation gain during both said seek control and said following control; and calculates said control signal from said calculated state signals.

12. The control device for a disk storage device of claim 11 wherein said control circuit sets said first eccentricity estimation gain to '0' during said seek control.

13. The control device for a disk storage device of claim 11 wherein said control circuit detects the position error between the target position and current position, compares said position error with a specified value and determines that control is following control when said position error is within the specified value, and determines that control is seek control when said position error exceeds the specified value.

14. The control device for a disk storage device of claim 11 wherein said control circuit calculates the estimated position signal, estimated velocity signal and estimated eccentricity signal for the next sample from said error and the estimated position signal, estimated velocity signal and estimated eccentricity signal for the current sample as well as from said actuator estimation gain and said eccentricity estimation gain, and calculates said control current from said estimated position signal, estimated velocity signal and estimated eccentricity signal for the current sample.

15. The control device for a disk storage device of claim 14 wherein said control circuit calculates the estimated position signal and estimated velocity signal for the next sample from said error and the estimated position signal and estimated velocity signal for the current sample, as well as from said actuator estimation gain; and calculates the estimated eccentricity signal for the next sample from said error and the estimated eccentricity signal for the current sample, as well as from said eccentricity estimation gain.

16. The control device for a disk storage device of claim 11 wherein said control circuit calculates a corrected state signal based on said error, previously calculated state signal, said actuator estimation gain and said eccentricity estimation gain;

calculates said control signal from said corrected state signal; and calculates the next state signal from said control signal and said corrected state signal.

17. The control device for a disk storage device of claim 16 wherein said control circuit calculates a corrected estimated position signal and estimated velocity signal from said error, the estimated position signal and estimated velocity signal for the previous sample, as well as from said actuator estimation gain; and calculates the estimated eccentricity signal for the next sample from said error, the estimated eccentricity signal for the previous sample and from said eccentricity estimation gain.

18. The control device for a disk storage device of claim 11 wherein said control circuit calculates the corrected estimated position signal and estimated velocity signal from said error, the previous estimated position signal and previous estimated velocity signal, and said actuator estimation gain;

calculates said control signal based on said corrected estimated position signal and previous estimated eccentricity signal; and calculates the next estimated position signal, next estimated velocity signal and next estimated eccentricity signal based on said error, said corrected estimated position signal and said corrected estimated velocity signal and previous estimated eccentricity signal.

19. The control device for a disk storage device of claim 11 wherein said control circuit saves in memory said estimated eccentricity signal for the head before changing, according to a head change instruction, then reads said estimated eccentricity signal for said head before change, and executes said calculation steps with said read estimated eccentricity signal as the initial value.

20. The control device for a disk storage device of claim 19 wherein said control circuit saves said converted value after said estimated eccentricity signal has been converted to the estimated eccentricity signal for the reference sector, then reads the said corrected estimated eccentricity signal from said memory and corrects said estimated eccentricity signal to the estimated eccentricity signal for the current sector.

21. A control method for a disk storage device, having a head for reading information on a disk storage medium, an actuator for moving said head, and a control circuit using eccentricity estimation observer control including a model of said actuator and a model of the eccentricity for calculating a control signal for driving said actuator based on a position signal that is read from said disk storage medium by said head, comprising:

a step of calculating corrected state signals, that include estimated position, estimated velocity, estimated bias and estimated eccentricity signals, based on an error between said position signal and said estimated position signal, previously calculated state signals, an actuator estimation gain for estimating actuator operation, and an eccentricity estimation gain during both seek control and following control;

a step of calculating said control signal from said corrected state signals; and a step of calculating the next state signals from said control signal and said corrected state signals.

22. A control method for a disk storage device, having a plural head for reading information on a disk storage medium, an actuator for moving said head, and a control circuit using eccentricity estimation observer control including a model of said actuator and a model of the eccentricity for calculating a control signal for driving said actuator based on a position signal that is read from said disk storage medium by said head, comprising:

a step of calculating state signals, that include estimated position, estimated velocity, estimated bias and estimated eccentricity signals, based on an error between said position signal and said estimated position signal, an actuator estimation gain for estimating actuator operation, and an eccentricity estimation gain during both seek control and following control;

a step of calculating said control signal from said corrected state signals; and a step of saving in memory said estimated eccentricity signal for a present selected head according to a head change instruction;

a step of reading the estimated eccentricity signal for a next selected head from said memory as an initial value of said estimated eccentricity signal in the calculation step.

23. A control device for a disk storage device having:

a head for reading information on a disk storage medium;

an actuator for moving said head; and a control circuit using eccentricity estimation observer control including a model of said actuator and a model of the eccentricity for calculating a control signal for driving said actuator based on a position signal that is read from said disk storage medium by said head; wherein said control circuit calculated corrected state signals, that included estimated position, estimated velocity, estimated bias and estimated eccentricity signals, based on an error between said position signal and said estimated position signal, previously calculated state signals, an actuator estimation gain for estimating actuator operation, and an eccentricity estimation gain during both seek control and following control;

calculates said control signal from said corrected state signals; and calculates the next state signals from said control signal and said corrected state signals.

24. A control device for a disk storage device having:

a head for reading information on a disk storage medium;

an actuator for moving said head;

a control circuit using eccentricity estimation observer control including a model of said actuator and a model of the eccentricity for calculating a control signal for driving said actuator based on a position signal that is read from said disk storage medium by said head; and a memory for storing an estimated eccentricity signal for each head, wherein said control circuit calculates state signals, that include estimated position, estimated velocity, estimated bias and estimated eccentricity signals, based on an error between said position signal and said estimated position signal, an actuator estimation gain for estimating actuator operation, and an eccentricity estimation gain during both seek control and following control;

calculates said control signal from said corrected state signals; and save in said memory said estimated eccentricity signal for a present selected head according to a head change instruction and reads the estimated eccentricity signal for a next selected head from said memory as an initial value of said estimated eccentricity signal in the calculation.

* * * * *

UNITED STATES PATENT AND TRADEMARK OFFICE
CERTIFICATE OF CORRECTION

PATENT NO.   : 6,421,200 B2
DATED        : July 16, 2002
INVENTOR(S)  : Kazuhiko Takaishi It is certified that error appears in the above-identified patent and that said Letters Patent is hereby corrected as shown below:

Column 22,
Line 25, delete "calculated" insert -- calculates --.

Signed and Sealed this

Eighteenth Day of March, 2003

JAMES E. ROGAN
*Director of the United States Patent and Trademark Office*